(12) United States Patent
Sandberg et al.

(10) Patent No.: US 6,379,984 B1
(45) Date of Patent: Apr. 30, 2002

(54) HIGH-PRECISION ETALON DEVICE AND METHOD OF CONSTRUCTION

(75) Inventors: Jon C. Sandberg; Ramin Lalezari, both of Boulder, CO (US)

(73) Assignee: Research Electro-Optics, Inc., Boulder, CO (US)

( * ) Notice: Subject to any disclaimer, the term of this patent is extended or adjusted under 35 U.S.C. 154(b) by 0 days.

(21) Appl. No.: 09/466,755

(22) Filed: Dec. 17, 1999

(51) Int. Cl.$^7$ ................................................ H01L 21/00
(52) U.S. Cl. .......................................... 438/29; 359/260
(58) Field of Search ............................... 438/29, 30–47, 438/14–18, 7, 800; 359/260; 356/454

(56) References Cited

U.S. PATENT DOCUMENTS 6,005,995 A * 12/1999 Chen et al. .................. 385/24

* cited by examiner

Primary Examiner—Charles Bowers
Assistant Examiner—Craig Thompson
(74) Attorney, Agent, or Firm—Jessica Costa; The Law Offices of Jessica Costa, P.C.

(57) ABSTRACT

A high-precision etalon and novel method of construction thereof is presented. The etalon comprises a pair of plane-parallel flat mirrors spaced a first distance apart, a pair of plane-parallel spacers transversely attached to the pair of mirrors which operate to fix the first distance between the pair of mirrors, and a thin film mirror layer deposited on at least one of the pair of plane-parallel flat mirrors to form a laser cavity therein of a precise second distance apart. The method of constructing an etalon in accordance with the invention includes the steps of fabricating one or more spacers, measuring the length of the spacer(s), and deriving a dimensional deviation of the spacer length from a nominal cavity dimension specified for the etalon. A thin-film pedestal is then deposited on one, the other, or both of a first and second substrate and then coated with a reflective coating. The etalon is then assembled using the spacer(s) and first and second substrates.

17 Claims, 4 Drawing Sheets

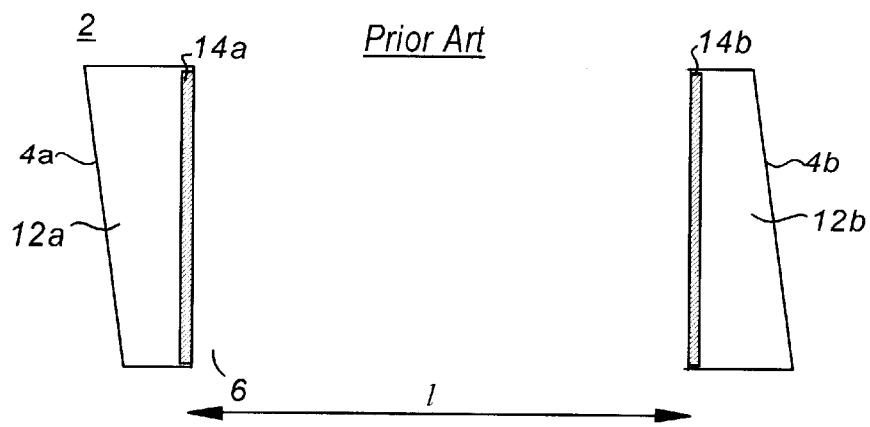
FIG. 1 *Prior Art*
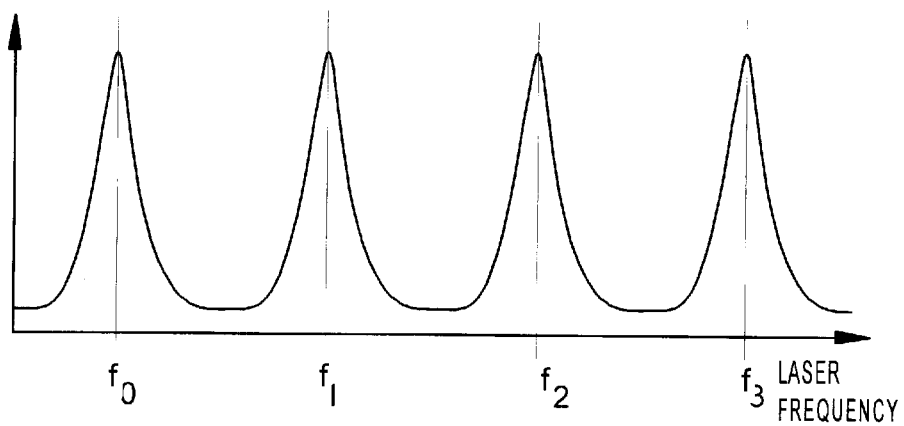
FIG. 2
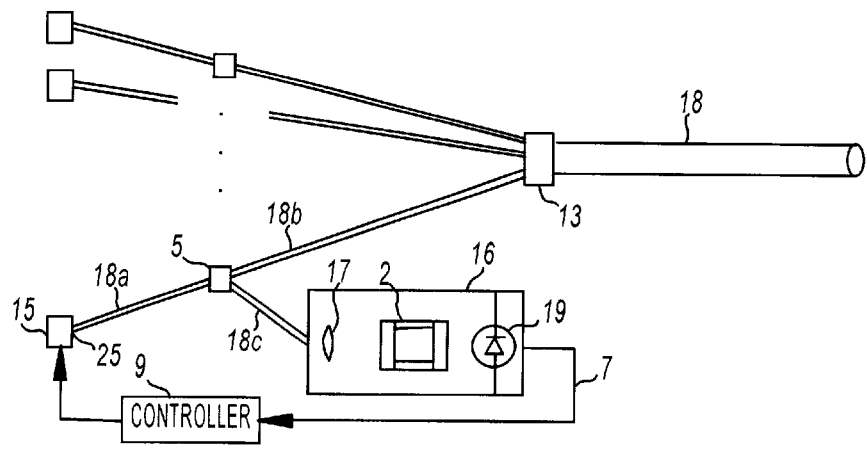
FIG. 3

HIGH-PRECISION ETALON DEVICE AND METHOD OF CONSTRUCTION

FIELD OF THE INVENTION

The present invention pertains generally to optical fiber communication systems, and more particularly, to a high-precision etalon for use in monitoring the frequency of an optical laser and method of construction thereof.

BACKGROUND OF THE INVENTION

Optical communication systems utilize optical fibers as information carrying channels. Their low attenuation properties make optical fibers a high-quality transmission medium and allow them able to achieve high data rates. Information is transmitted onto and received from an optical network via optical links which implement a transmitter, receiver, or both. An optical transmitter is implemented with a laser, which is a very high frequency optical oscillator constructed from an amplifier and an appropriate amount of positive feedback.

An etalon is the passive resonant structure often used as an optical filter to establish the wavelength of a transmitted laser beam at a predefined frequency. As known by those skilled in the art, an etalon is an optical resonator comprising two plane-parallel, flat mirrors placed a fixed distance apart. Because its intercavity spacing is fixed, the peak transmission frequencies defined by a particular etalon are unchangeable. The etalon is characterized by a series of equally spaced resonant frequencies that cause it to operate as a comb filter when used as a transmitter. Hence, the etalon is an ideal device for ensuring the proper separation of channel frequencies on a multiple-channel high-resolution optical fiber.

FIG. 1 is a schematic diagram of a conventional etalon optical filter (hereinafter "etalon") 2. Etalon 2 includes two plane-parallel partially transmissive feedback mirrors 4a and 4b positioned to form a cavity 6 therebetween. Mirrors 4a and 4b are formed as a pair of flat transparent substrates 12a and 12b to each of which a reflective coating 14a and 14b has been applied. It is common practice to form the substrates 12a, 12b as slightly wedge-shaped and to coat the outer faces of substrates 12a and 12b with an anti-reflective layer to prevent the substrates themselves from acting as optical resonators Cavity 6 is typically air-filled, or may comprise a crystalline or glassy solid, insulating material, or semiconductor material When used as an optical filter, a laser beam is transmitted through one of the mirrors 4a, 4b, which reflects between the mirrors 4a and 4b in the etalon cavity 6, resulting in constructive interference and a repetitive series of high transmission spikes. The peak transmission of light passing through the etalon 2 occurs at resonant frequencies $f_m$.

The transmission characteristics of the etalon 2 are illustrated in FIG. 2. The frequencies $f_m$ of maximum transmission satisfy the equation:

$$f_m = \frac{mc_0}{2nl\cos\theta},$$

where m is an integer, $c_0$ is the velocity of light in a vacuum, n is the refractive index of the cavity 6, l is the spacing between the mirrors 4a and 4b, and θ is the angle of refraction of the incident light, and λ is the wavelength of the light between the reflectors 4a and 4b. Adjacent frequencies at which the etalon shows maximum transmission are separated by a frequency.

$$\Delta f = \frac{c_0}{2n\cos\theta},$$

where Δf is called the free spectral range (FSR) of the etalon. The frequencies $f_m$ of maximum transmission are equally spaced. A device that has this characteristic is called a comb filter.

The free spectral range FSR is constant for a given wavelength, which is dependent upon the spacing l of the gap of cavity 6. Techniques such as wedge tilting exist, in which the angle of the incident light is adjusted, for shifting the maximum transmission frequencies $f_m$ a small degree (e.g., less than 15°). Accordingly, in applications which require a precise FSR, the spacing l of the gap of the cavity 6 of the etalon 2 must be within very tight tolerance limits.

FIG. 3 illustrates a typical application of an optical filter etalon. In particular, FIG. 3 is a block diagram of a portion of a fiber optic network that employs an etalon 2 to monitor the wavelengths of a multiple-channel optical fiber 18. In this application, the goal is to lock the frequency of the transmitted laser beam to a frequency that overlaps one of the resonant frequency $f_m$ of the etalon 2.

In operation, a laser 15 generates a laser beam 25 at a frequency $f_x$. Laser beam 15 is transmitted onto optical fiber 18a, which passes through a coupler 5. Coupler 5 couples most of the signal (e.g., 90%) onto optical fiber 18b, which couples to optical cable 18 for transmission to other destinations Coupler 5 couples the remaining portion of the laser beam signal 25 onto optic fiber 18c, which is received by wave blocker 16. Wave blocker 16 comprises a lens 17, etalon 2, and a detector 19. Lens 17 focuses the laser beam 25 received from optic fiber 18c for transmission through etalon 2. Etalon 2 filters the received beam 25 according to its resonant frequencies $f_m$. Detector 19 detects whether or not the frequency $f_x$ of the laser beam 25 overlaps one of the etalon's resonant frequencies $f_m$. The detector output is used by a laser frequency controller 9 to adjust the output frequency $f_x$ of the laser beam 25.

The etalon filters are manufactured such that the resonant frequencies $f_m$ overlap the standard channels set up and regulated by the Federal Communication Commission (FCC) or International Telecommunications Unions (ITU) for fiber optic transmission. The standard channel definition provides for the communication of data across optical fibers between local, national, and even international data exchanges.

Etalons must be manufactured with a cavity gap 6 spacing l of a precise length to allow the maximum transmission frequencies $f_m$ (i.e., the transmission peaks in FIG. 2) to overlap the defined standardized channel. Although the exact values of the maximum transmission frequencies $f_m$ can be changed slightly via etalon wedge tilting techniques, if the spacing Δf of the transmission peaks is not exact, it is impossible to line up all the peaks to overlap with the defined channels even with tilting.

Recently, a strong commercial interest has centered around the use of temperature stable etalons for telecommunications applications in the 1.55 um wavelength range. To achieve the high level of required temperature stability, these etalons are typically manufactured using mirrors separated with a fixed air gap whose length is determined by a precision polished spacer made from a low thermal expansion material such as ULE or Zerodur. For the intended applications, the etalons must also have very tight control over the effective spacing l of the mirrors. This requires that the polishing process in which the spacers are fabricated be controlled precisely in order to hold the finished length of the spacers to within typically a few fractions of a micron or less of the desired value l. In a volume manufacturing process this requirement poses serious difficulties in terms of both metrology and process control, causing the manufacturing process to be very expensive. Specifically, because of the difficulty in controlling the polishing process to the degree of accuracy required in these applications (i.e., to within a fraction of a micron), the current wafer polishing technique cannot meet the demands for manufacture of high-precision etalons. Accordingly, a need exists for an alternative high-volume method for manufacturing high-precision etalons.

SUMMARY OF THE INVENTION

The present invention is a novel high-precision manufacturing process that greatly facilitates high-volume economic manufacture of air spaced etalons in which the mirror spacing must be controlled within a fraction of a micron. The invention utilizes coating deposition processes, which are fundamentally easier to monitor and control than polishing processes, to allow fine control over cavity gap spacing.

In accordance with one embodiment of the invention, a set of spacers or spacer material is fabricated on a wafer using wafer polishing techniques to meet all wedge and flatness requirements for the product (verified interferometrically); however, the thickness of the wafer is left to exceed the nominal dimension of the specified cavity gap space by a small amount that can be confidently measured by precision mechanical tools. The wafer is then removed from the polishing block and diced into spacers.

The length of the spacers is then measured by optical means to a precision better than the tolerance on the final etalon product.

A value is then derived for the dimensional deviation of the spacer length from the specified nominal dimension of the final etalon product.

A thin film deposition process is then used to deposit a transparent thin-film pedestal on at least one of the substrates that are used to fabricate the mirrors of the etalon. The physical thickness of this layer is equal to half of the dimensional difference between the actual spacer length and the nominal specified gap dimension. Typically the deposition process can provide control over the layer thickness to a level of 0.01 um or better, which exceeds the tolerance of the cavity gap length required of current commercial products. This layer covers only that portion of the mirror substrate that is open to the air gap; it does not cover that portion of the mirror substrate that comes into contact with the spacer. Accordingly, a thin-film pedestal is built up on the substrate. A reflective coating is then deposited on top of the thin film layer.

The etalon is then assembled from its constituent pieces. Due to the deposition of the adjustment thin film layer, the spacing of the mirrors is precisely equal to the desired nominal value, even though the thickness of the spacer may deviate from the nominal by an amount substantially larger than the tolerance on the mirror spacing.

An analogous process in which the spacer is made slightly smaller than the nominal dimension provides for the deposition of the thin film thickness adjustment layer directly on the spacer.

BRIEF DESCRIPTION OF THE DRAWINGS

The invention will be better understood from a reading of the following detailed description taken in conjunction with the drawing in which like reference designators are used to designate like elements, and in which:

FIG. 1 is a schematic diagram of a conventional Fabry-Perot etalon;

FIG. 2 is a graph illustrating etalon transmission characteristics;

FIG. 3 is a block diagram of a portion of an optical communication system that employs an optical filter etalon;

DETAILED DESCRIPTION

A novel high-precision etalon and method of manufacturing is described in detail hereinafter. While the inventive principles are illustrated with respect to an air-spaced etalon device, the embodiments described herein are illustrated by way of example only and not by way of limitation.

Figure 4:
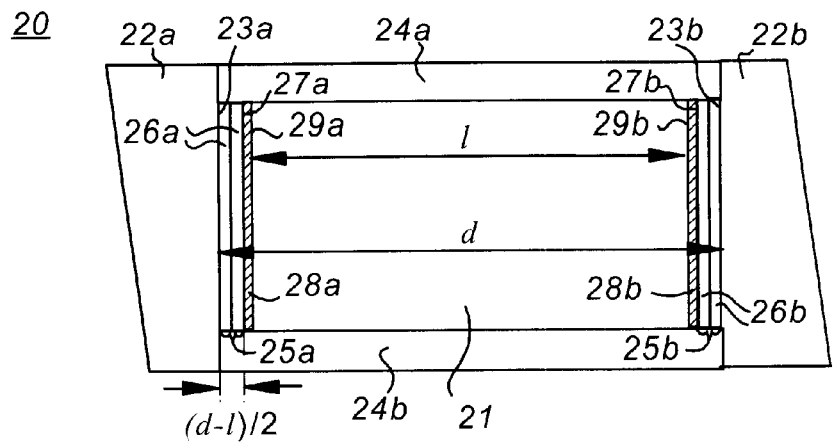
FIG. 4 is a pictorial diagram of an etalon constructed in accordance with the invention.

FIG. 4 is a pictorial diagram of one embodiment of an etalon 20 constructed in accordance with the invention. As illustrated, the etalon 20 comprises a pair of substrates 22a, 22b having optically-flat plane-parallel surfaces 23a, 23b that are spaced a distance d apart by a pair of plane-parallel spacers 24a and 24b. The distance d is greater than the required tolerance limits of the specified gap distance l for the etalon 2. At least one thin-film layer 26a, 26b is deposited on each of the respective surfaces 23a and 23b of the respective substrates 22a and 22b on the portion of the substrates 22a, 22b that is not attached to the spacers 24a and 24b. The thin-film layer(s) 26a, 26b thus form a pedestal 25a, 25b on each of respective substrates 22a, 22b. A reflective coating 28a, 28b is applied on top of each of the pedestals 25a, 25b. The thickness of the pedestals are such that the distance between the respective plane-parallel surfaces 29a and 29b of the respective reflective coatings 28a, 28b is within the specified tolerance limits of the specified gap distance l. In the preferred embodiment, the thickness of the pedestals are equal, each having a thickness of (d—l)/2. A cavity 21 is formed between the inner surfaces of spacers 24a, 24b and the respective plane-parallel surfaces 29a and 29b of the respective reflective coatings 28a, 28b. In the preferred embodiment, cavity 21 is air-filled.

Figure 5:
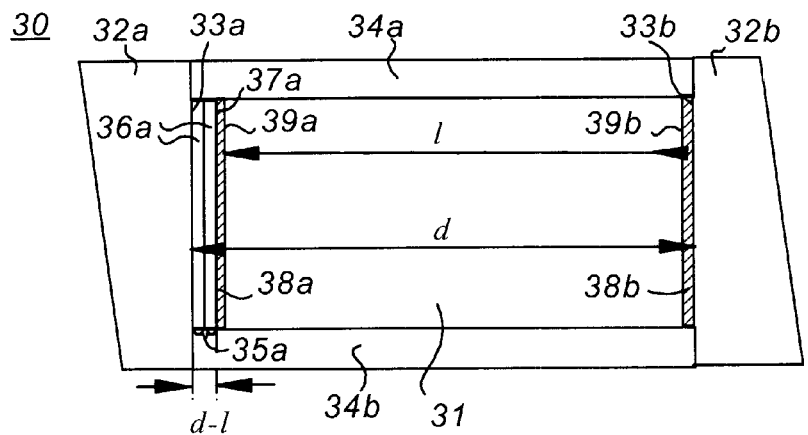
FIG. 5 is a pictorial diagram of an alternative embodiment of an etalon constructed in accordance with the invention.

FIG. 5 is a pictorial diagram of an alternative embodiment of an etalon 30 constructed in accordance with the invention. As illustrated, the etalon 30 is similarly structured in that it comprises a pair of substrates 32a, 32b having optically-flat plane-parallel surfaces 33a, 33b that are spaced a distance d apart by a pair of plane-parallel spacers 34a and 34b. The distance d is greater than the required tolerance limits of the specified gap distance l for the etalon 2. At least one thin-film layer 26a is deposited on one of the respective surfaces 23a (shown) of the respective substrates 22a on the portion of the substrate 22a that is not attached to the spacers 24a and 24b. The thin-film layer(s) 26a thus forms a pedestal 25*a* on the substrate 22*a*. A reflective coating 28*a* is applied on top of the pedestal 25*a*. The thickness of the pedestal is such that the distance between the respective plane-parallel surfaces 29*a* and 29*b* of the respective reflective coatings 28*a*, 28*b* is within the specified tolerance limits of the specified gap distance l. In the preferred embodiment, the thickness of the pedestal is equal (within tolerance) to the length of the spacers 34*a*, 34*b* d less the specified gap distance l (i.e., d−l). A cavity 31 is formed between the inner surfaces of spacers 34*a*, 34*b* and the respective plane-parallel surfaces 39*a* and 39*b* of the respective reflective coatings 38*a*, 38*b*.

Figure 6:
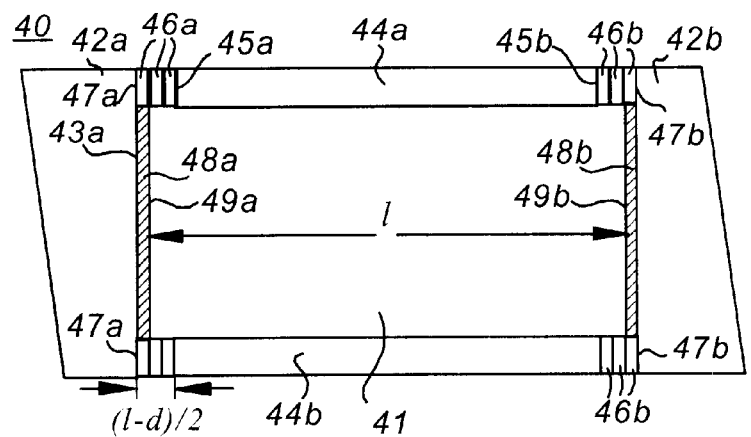
FIG. 6 is a pictorial diagram of still another embodiment of an etalon constructed in accordance with the invention.

FIG. 6 is a pictorial diagram of an alternative embodiment of an etalon 40 constructed in accordance with the invention. As illustrated, the etalon 40 comprises a pair of substrates 42*a*, 42*b* having optically-flat plane-parallel surfaces 43*a*, 43*b*. A pair of plane-parallel spacers 44*a* and 44*b* of length d each have a respective pair of optically-flat plane-parallel ends 45*a* and 45*b*. At least one thin-film layer 46*a*, 46*b* of material is deposited to form pedestals 47*a*, 47*b* on each of the respective ends 45*a* and 45*b* of spacers 44*a*, 44*b*, such that the length of each spacer 44*a*, 44*b* together with their thin-film pedestals 47*a* and 47*b* are within the tolerance limits of the specified gap distance l. In the preferred embodiment, the length of each pedestal is equal to half the specified gap distance l less the length d of the spacer (within tolerance). A portion of the surface 43*a* of substrate 42*a* is adhered at a normal angle to the end pedestal surface of each of the spacers 44*a* and 44*b*. Similarly, a portion of the surface 43*b* of substrate 42*b* is adhered at a normal angle to the end pedestal surface of each of the spacers 44*a* and 44*b*. A reflective coating 48*a*, 48*b* is applied to each of the surfaces 43*a*, 43*b* on the portion of the respective substrates 42*a*, 42*b* that lie between the spacers 44*a*, 44*b*. A cavity 41 is formed between the inner surfaces of spacers 44*a*, 44*b* and the respective plane-parallel outer surfaces 49 a and 49 b of the reflective coatings 48*a* and 48*b*.

Figure 7:
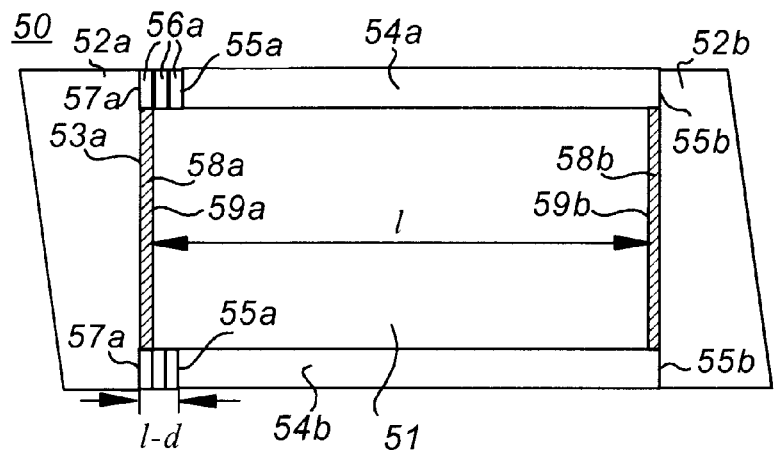
FIG. 7 is a pictorial diagram of yet another embodiment of an etalon constructed in accordance with the invention.

FIG. 7 is a pictorial diagram of an yet another alternative embodiment of an etalon 50 constructed in accordance with the invention. As illustrated, the etalon 50 comprises a pair of substrates 52*a*, 52*b* having optically-flat plane-parallel surfaces 53*a*, 53*b*. A pair of plane-parallel spacers 54*a* and 54*b* of length d each have a respective pair of optically-flat plane-parallel ends 55*a* and 55*b*. At least one thin-film layer 56*a* of material is deposited to form pedestals 57*a* on one end 55*a* of each of spacers 54*a*, 54*b*, such that the length of each spacer 54*a*, 54*b* together with their thin-film pedestals 57*a* are within the tolerance limits of the specified gap distance l. In the preferred embodiment, the length of each pedestal is equal to the specified gap distance l less the length d of the spacer (within tolerance). A portion of the surface 53*a* of substrate 52*a* is adhered at a normal angle to the end pedestal surface of each of the spacers 54*a* and 54*b*. Similarly, a portion of the surface 53*b* of substrate 52*b* is adhered at a normal angle to the end 55*b* of each of the spacers 54*a* and 54*b*. A reflective coating 58*a*, 58*b* is applied to each of the surfaces 53*a*, 53*b* on the portion of the respective substrates 52*a*, 52*b* that lie between the spacers 54*a*, 54*b*. A cavity 51 is formed between the inner surfaces of spacers 54*a*, 54*b* and the respective plane-parallel outer surfaces 59*a* and 59*b* of the reflective coatings 58*a* and 58*b*.

Figure 8:
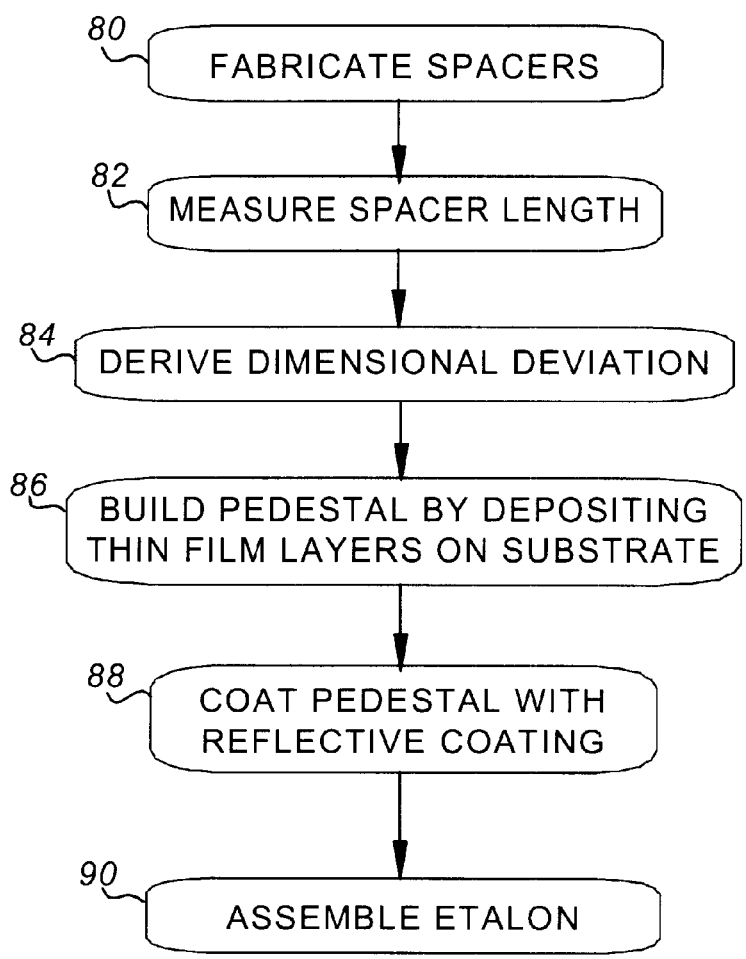
FIG. 8 is an operational flowchart illustrating a method in accordance with the invention for constructing one embodiment of the high-precision etalon of the invention.

FIG. 8 is an operational flowchart of a method for manufacturing a high-precision air-spaced etalon. In accordance with the method of the invention, a set of spacers or spacer material is fabricated 80 to meet all wedge and flatness requirements for the product (verified interferometrically). In the preferred embodiment, the spacers are fabricated as a semiconductor wafer, mechanically lapped using a rotating lapping machine and an aluminum oxide slurry (which flattens the wafer surfaces, makes them parallel and reduces mechanical defects like saw markings), etched in a solution of nitric acid/acetic acid or sodium hydroxide (to remove microscopic cracks or surface damage created by the lapping process, and polished using a chemical mechanical polishing (CMP) process. In a first embodiment, the length d of the spacer is purposely fabricated to exceed the nominal dimension l by a small amount. Preferably, this small amount is the smallest amount that can be confidently measured by precision mechanical tools.

The length d of the spacer is then measured 82 preferably using optical means to a precision better than the tolerance on the final product.

A value is then derived 84 for the dimensional deviation of the spacer length d from the nominal cavity dimension l specified for the etalon.

A thin film deposition process is then used to deposit 86 a layer 28 on the substrate 22*a*, 22*b* that will be used to fabricate the mirrors of the etalon 20. The physical thickness of this layer is equal to half of the dimensional difference between the actual spacer length d and nominal value l. Typically the deposition process can provide control over the layer thickness to a level of 0.01 um or better, which exceeds the tolerance on spacer thickness required of current commercial products. This layer covers only that portion of the mirror substrate that is open to the air gap 26; it does not cover that portion of the mirror substrate that comes into contact with the spacer.

The mirror coating is then deposited 88 on top of the thin film layer 28.

The etalon 20 is then assembled 90 from its constituent pieces. Due to the deposition of the thin film pedestal on the substrates, the spacing of the mirrors is precisely equal to the desired nominal value l, even though the length d of the spacer may deviate from the nominal value l by an amount substantially larger than the tolerance on the mirror spacing.

Figure 9:
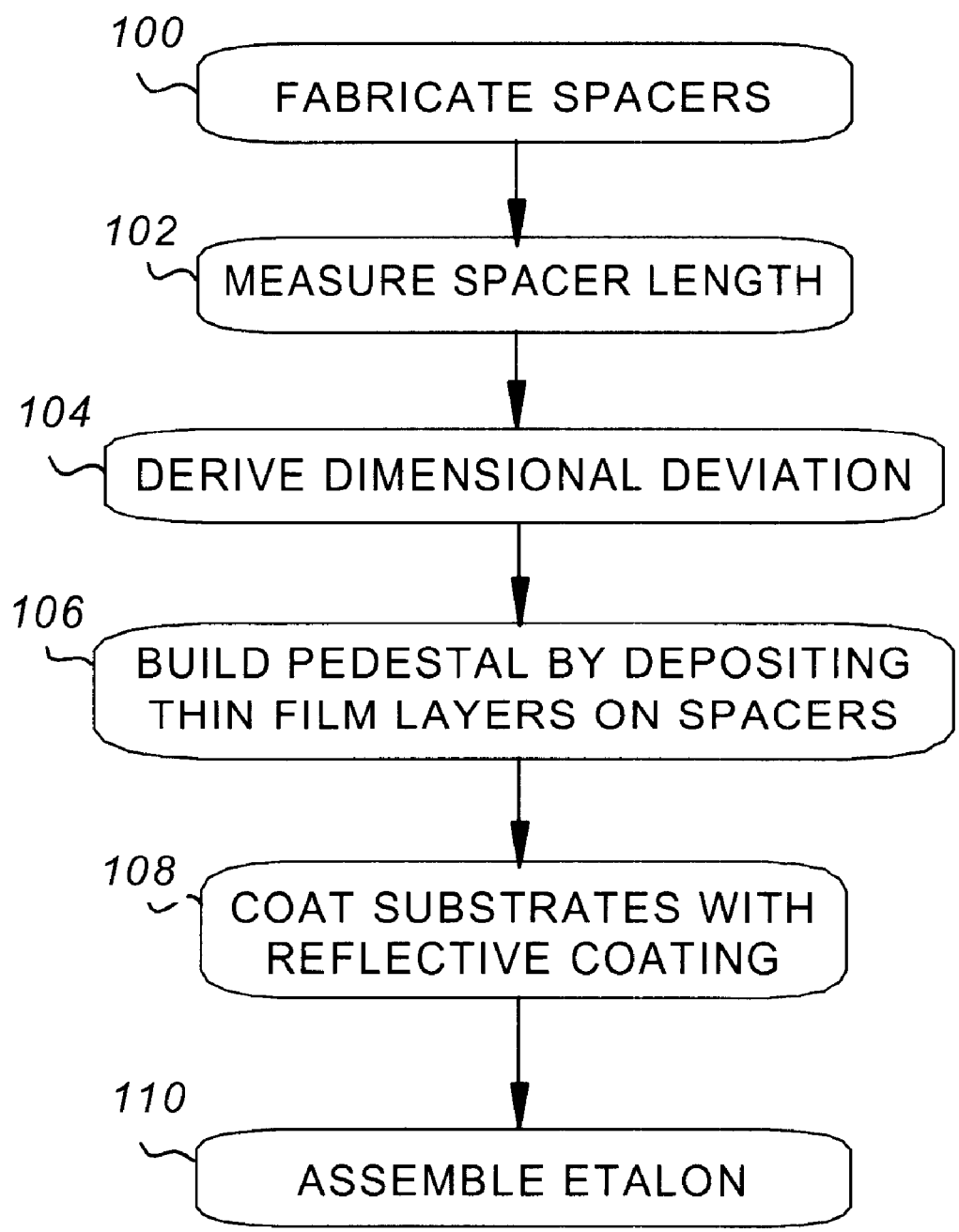
FIG. 9 is an operational flowchart illustrating a method in accordance with the invention for constructing another embodiment of the high-precision etalon of the invention.

FIG. 9 is an operational flowchart of a method for manufacturing a high-precision air-spaced etalon. In accordance with the method of the invention, a set of spacers or spacer material is fabricated 100 to meet all wedge and flatness requirements for the product (verified interferometrically). In the preferred embodiment, the spacers are fabricated as a semiconductor wafer, using the wafer polishing techniques described above with respect to FIG. 8. In this embodiment, the length d of the spacer is fabricated to be less than the nominal dimension l by a small amount. Preferably, this small amount is the smallest amount that can be confidently measured by precision mechanical tools.

The length d of the spacer is then measured 102 preferably using optical means to a precision better than the tolerance on the final product.

A value is then derived 104 for the dimensional deviation of the spacer length d from the nominal cavity dimension l specified for the etalon.

A thin film deposition process is then used to deposit 106 a thin-film pedestal on the end or ends of the spacers 44*a*, 44*b* to increase the total length of the spacers plus pedestal (s) to the nominal specified value l (within tolerance. If a pedestal is formed on only one end of the spacers, the physical thickness of each of the thin-film pedestal is equal to the dimensional difference between the actual spacer length d and nominal value l. If a pedestal is formed on both ends of the spacers, the physical thickness of each of the thin-film pedestal is preferably equal to half of the dimensional difference between the actual spacer length d and nominal value l.

A reflective coating is then deposited 108 on the portion of the substrates 42a, 42b that will be exposed to form the inner cavity 41.

The etalon 40 is then assembled 90 from its constituent pieces. Due to the deposition of the thin-film pedestals, the spacing of the mirrors is precisely equal to the desired nominal value l, even though the length d of the spacers 44a, 44b may deviate from the nominal value l by an amount substantially less than the tolerance on the mirror spacing.

Although the invention has been described in terms of the illustrative embodiments, it will be appreciated by those skilled in the art that various changes and modifications may be made to the illustrative embodiments without departing from the spirit or scope of the invention. It is intended that the scope of the invention not be limited in any way to the illustrative embodiment shown and described but that the invention be limited only by the claims appended hereto.

What is claimed is:

1. A method for fabricating a high-precision etalon, comprising:

fabricating a first spacer;

measuring a length of said first spacer;

deriving a dimensional deviation of said first spacer length from a nominal cavity dimension specified for the etalon;

depositing a first thin-film pedestal on a first substrate;

coating said first thin-film pedestal with a reflective coating; and constructing said etalon using said first spacer and said first substrate.

2. The method in accordance with claim 1, wherein:
   said spacer is fabricated on a semiconductor wafer using wafer polishing techniques.

3. The method in accordance with claim 1, wherein:
   said spacer length is fabricated to exceed said nominal cavity dimension.

4. The method in accordance with claim 1, wherein:
   said first thin-film pedestal is deposited on said first substrate by depositing a plurality of thin film layers one on top of another on said first substrate.

5. The method in accordance with claim 1, wherein:
   said thin-film pedestal comprises a thickness equal to the dimensional difference between said spacer length and said nominal cavity dimension.

6. The method in accordance with claim 1, comprising:
   depositing a second thin-film pedestal on a second substrate;
   coating said second thin-film pedestal with a reflective coating; and
   constructing said etalon using said first spacer, said first substrate and said second substrate.

7. The method in accordance with claim 6, wherein:
   said spacer length is fabricated to exceed said nominal cavity dimension.

8. The method in accordance with claim 7, wherein:
   said first thin-film pedestal is deposited on said first substrate by depositing a plurality of thin film layers one on top of another on said first substrate and said second thin-film pedestal is deposited on said second substrate by depositing a plurality of thin film layers one on top of another on said second substrate.

9. The method in accordance with claim 8, wherein:
   both said first thin-film pedestal and said second thin-film pedestal each comprise a thickness equal to half the dimensional difference between said spacer length and said nominal cavity dimension.

10. A method for fabricating a high-precision etalon, comprising:

fabricating a first spacer;

measuring a length of said first spacer;

deriving a dimensional deviation of said first spacer length from a nominal cavity dimension specified for the etalon;

depositing a first thin-film pedestal on a first end of said first spacer;

coating a first substrate and a second substrate with a reflective coating; and constructing said etalon using said first spacer, said first substrate, and said second substrate.

11. The method in accordance with claim 10, wherein:
    said spacer is fabricated on a semiconductor wafer using wafer polishing techniques.

12. The method in accordance with claim 10, wherein:
    said spacer length is fabricated to be less said nominal cavity dimension.

13. The method in accordance with claim 10, wherein:
    said first thin-film pedestal is deposited on said first end of said first spacer by depositing a plurality of thin film layers one on top of another on said first end of said first spacer.

14. The method in accordance with claim 10, wherein:
    said thin-film pedestal comprises a thickness equal to the dimensional difference between said spacer length and said nominal cavity dimension.

15. The method in accordance with claim 10, comprising:
    depositing a second thin-film pedestal on a second end of said first spacer.

16. The method in accordance with claim 15, wherein:
    both said first thin-film pedestal and said second thin-film pedestal each comprise a thickness equal to half the dimensional difference between said spacer length and said nominal cavity dimension.

17. A high-precision etalon comprising:

a pair of plane-parallel flat mirrors spaced a first distance apart;

a pair of plane-parallel spacers transversely attached to said pair of mirrors which operate to fix said first distance between said pair of mirrors; and a thin film mirror layer deposited on at least one of said pair of plane-parallel flat mirrors to form a laser cavity therein of a precise second distance apart.

* * * * *